United States Patent [19]
Yoshida et al.

[11] Patent Number: 5,444,636
[45] Date of Patent: Aug. 22, 1995

[54] METHOD AND APPARATUS FOR CONTROLLING FEED RATE AT ARCUATE PORTIONS

[75] Inventors: Jun Yoshida; Akira Kawana; Nobuo Kurisaki, all of Kanagawa, Japan

[73] Assignee: Makino Milling Machine Co., Ltd., Tokyo, Japan

[21] Appl. No.: 931,981

[22] Filed: Aug. 19, 1992

[30] Foreign Application Priority Data

Aug. 30, 1991 [JP] Japan .................. 3-244211
Aug. 30, 1991 [JP] Japan .................. 3-244212
Aug. 30, 1991 [JP] Japan .................. 3-244213

[51] Int. Cl.⁶ .............. G05B 19/19; G05B 19/41; G06F 19/00
[52] U.S. Cl. ................... 364/474.3; 318/571; 364/474.29; 364/474.31
[58] Field of Search ........... 364/474.3, 474.14, 474.29, 364/474.31, 474.35; 318/571, 573, 572

[56] References Cited

U.S. PATENT DOCUMENTS

| | | | |
|---|---|---|---|
| 4,543,625 | 9/1985 | Nozawa et al. | 364/474.3 |
| 4,894,594 | 1/1990 | Kawamura et al. | 318/567 |
| 4,914,364 | 4/1990 | Hirai | 364/474.29 X |
| 4,914,599 | 4/1990 | Seki et al. | 364/474.3 X |
| 4,947,336 | 8/1990 | Froyd | 364/474.3 |
| 5,005,135 | 4/1991 | Morser et al. | 364/474.29 X |

FOREIGN PATENT DOCUMENTS 2-72414  3/1990  Japan .

*Primary Examiner*—Joseph Ruggiero
*Attorney, Agent, or Firm*—Foley & Lardner

[57] ABSTRACT

A tolerable feed rate is calculated to cause mechanical shock not exceeding a tolerable level in an arcuate machining based on the radius of the path of tool movement at arcuate machining portions and the predetermined tolerable acceleration. A deceleration start timing is set by reference to the end of an arcuate machining and the predetermined deceleration so that the feed rate is lower enough to maintain the tolerable mechanical shock at the end of an arcuate machining. An optimum feed rate is set for arcuate and completely circular machining based on the classification judgment of the arc or complete circle.

22 Claims, 8 Drawing Sheets

METHOD AND APPARATUS FOR CONTROLLING FEED RATE AT ARCUATE PORTIONS

BACKGROUND OF THE INVENTION

The present invention relates to a feed rate control method and apparatus in a numerical control system, more specifically to a feed rate control method and apparatus at arcuate portions for feeding a tool at an appropriate feed rate in an arcuate path of movement for enabling high efficiency and highly accurate machining.

Numerically controlled machine tool technology using a built-in computer has advanced significantly because of rapid progress in computer technology and numerical control techniques. This technology is used for the production of complicated shapes of workpieces to be machined (such as parts of airplanes, automobiles, etc.) at high machining speeds. In order to process complicated curved surfaces at a high speed, there are increased numbers of arcuate portions to be machined. A frequently used technique is to move a tool in an arcuate manner even at straight (non-rounded) corners.

Disclosed in Japanese patent laid-open No. 72414/90 is a feed rate control method for machining at the maximum possible speed by moving the tool in a straight line at straight corners. This feed rate control method for numerical control comprises the steps of calculating the maximum tolerable rate of change in speed for each axis from the maximum tolerable torque by presetting the maximum feed rate Fmax and the maximum tolerable torque for each axis, calculating the change in speed for each axis at a specified path corner when an actual feed rate is set equal to the maximum feed rate, making a judgment if the change in speed for each axis is higher than time respective maximum tolerable change in speed, calculating the feed rate Fo to reduce the change in speed below the maximum tolerable change in speed if it is higher, and decelerating the feed rate at the corner from Fmax to Fo.

The above control method is effective in a case where the tool moves in straight lines at corners. However, the machining speed is limited in a case where a tool moves in an arcuate manner, because the acceleration changes very rapidly. Change in acceleration becomes the maximum at the transition from an arcuate machining to a linear machining. Such change in acceleration accompanies adverse movement or vibration (hereinafter referred to as mechanical shock) in the machine tool. This results in poor machining accuracy and is an obstacle to high speed machining because the tool cannot be fed at a high speed.

It is conventional in machining curved surfaces that the feed rate of time machine tool is decreased to a certain degree, as compared with the feed rate in a linear machining, whenever the machine tool reaches an arcuate portion. Deceleration in the feed rate remains relatively low if the radius of curvature of the arcuate portion is relatively large. However, the feed rate must be decreased significantly to avoid large mechanical shock if the radius is small. Deceleration in the feed rate at an arcuate portion is specified in the numerical control program and thus preset by the programmer. Such decelerated machining is not only limited to arcuate portions but also to completely circular machining.

The feed rate previously set in the NC program by the programmer is first read out to determine where to start deceleration so that the feed rate at the initial position of the machining block always remains below the speed specified for the block. A deceleration control apparatus a for automatically performing such deceleration are disclosed in U.S. Pat. No. 4894594 and European patent application publication number:299080. It can save time by the automatic deceleration control, but leaves the time consuming setting of the feed rate in the NC program.

As described above, it was typical in the conventional numerical control system to reduce the feed rate to a predetermined low rate at circular machining portions in a linear-curved surface-linear machining step. Such reduction in feed rate depends primarily on the experience of each programmer.

However, acceleration changes significantly at the transition between the circular and the linear machining portions. In the conventional approach to set the speed by the programmer's experiences or various experiments, it is almost impossible to set the optimum feed rate at arcuate machining portions. It is normally set to substantially lower rate for safety purpose or to provide a margin. This is an obstacle to a high speed machining. Additionally, tools vary in size, thereby varying the distance or offset between the workpiece to be machined and the center of the tool. As the offset varies, the radius of an arcuate machining also varies and thus varying the optimum feed rate for such arcuate machining. This makes it more difficult to set the optimum feed rate.

It may be possible to obtain the optimum feed rate through experiments using the actual workpiece to be machined and the actual tool. However, the number of arcuate machining portions increases progressively as the complexity of the machining shape increases. This approach is also very difficult if you take the required tools into consideration.

In high speed machining, fluctuation phenomena of the machine due to sudden change in acceleration cause different machining accuracies depending whether the tool travels through a joint between straight and arcuate portions or a completely circular portion. That is, accuracy is lower at arcuate portions as compared with completely circular portions.

Nevertheless, it was the conventional to decelerate the feed rate at a constant factor of the automatic speed control system at both arcuate and completely circular portions. Accordingly, the overall machining speed cannot be increased, despite the fact that no machining accuracy problem is caused at completely circular portions if machined at the constant of the automatic speed control system for arcuate portions.

It is therefore an object of the present invention to provide a method and an apparatus for feed rate control at arcuate portions capable of minimizing mechanical shock to the tools machining curved portions, and achieving higher machining speed and accuracy by optimum setting of the feed rate at arcuate portions.

It is another object of the present invention to provide a method and an apparatus for achieving feed rate control at arcuate portions including both arcuate and completely circular machining portions capable of increasing the overall machining speed by setting a higher feed rate at completely circular machining portions than that at arcuate machining portions while maintaining a predetermined accuracy.

SUMMARY OF THE INVENTION

According to the present invention, a tolerable feed rate is calculated to cause mechanical shock not exceeding a tolerable level in an arcuate machining based on the radius of the path of tool movement at arcuate machining portions and the predetermined tolerable acceleration. The actual feed rate at arcuate portions is set based on the calculated tolerable speed. A judgment is made whether or not the predetermined feed rate is higher than the tolerable feed rate. If it is higher, the actual feed rate is set to the tolerable feed rate. On the other hand, if it is lower than the tolerable feed rate, the actual feed rate is set to the command feed rate, thereby achieving high speed, high accuracy machining.

Also, attention is paid to fact that the mechanical shock occurs at the completion of an arcuate machining. Accordingly, in the present invention, a deceleration start timing is set by reference to the end of an arcuate machining and the predetermined deceleration so that the feed rate is low enough to maintain tolerable mechanical shock at the end of an arcuate machining. This assures that a given deceleration speed is always reached at the end of each arcuate machining even if the length of an arcuate portion is shorter than the minimum length requiring deeeleration. In this manner, an arcuate machining can be performed at higher speed and with higher accuracy.

Additionally, in the present invention, paths of tool movement are classified into arc or complete circle. An optimum feed rate is set for arcuate and completely circular machining based on the classification or judgment. A high speed, highly accurate machining of curved surfaces is achieved by choosing the feed rate for completely circular machining higher than tile feed rate for arcuate machining.

DESCRIPTION OF PREFERRED EMBODIMENTS

The present invention will be described in detail hereunder by reference to the accompanying drawings.

Figure 1:
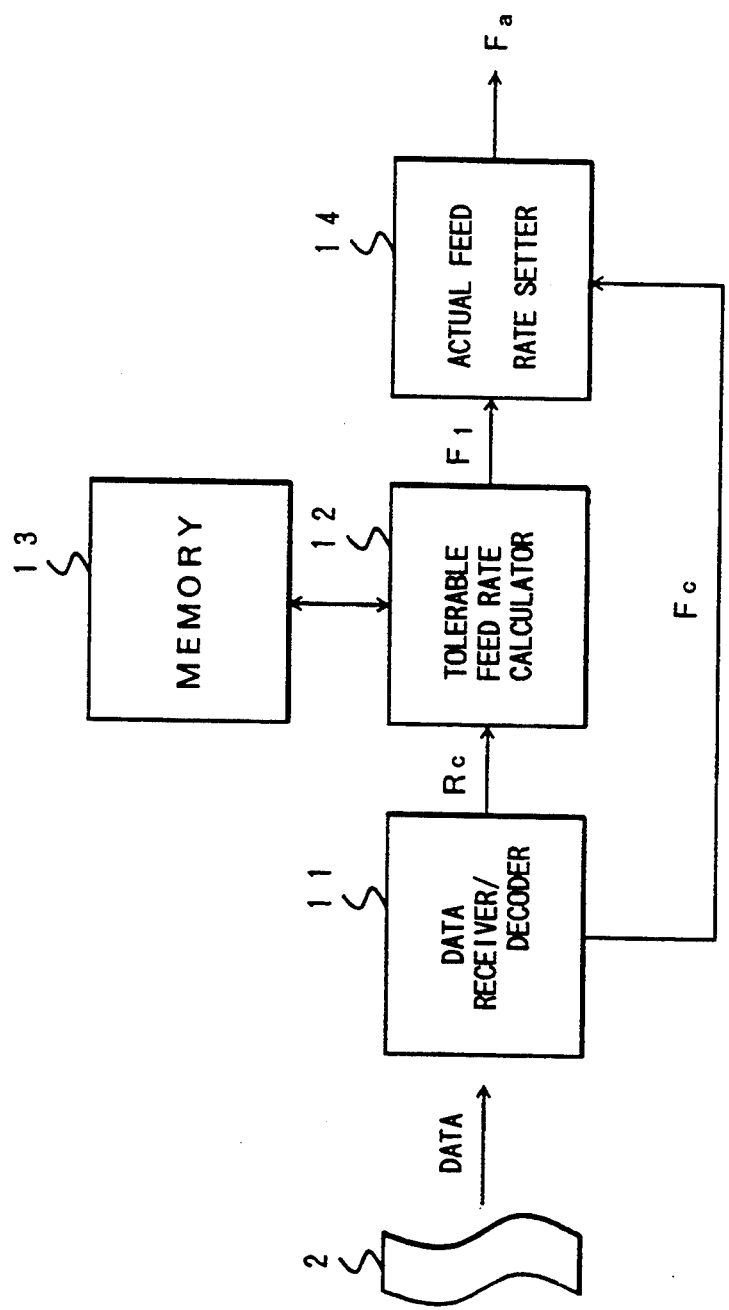
FIG. 1 is a block diagram illustrating a first embodiment of the feed rate control system at arcuate portions according to the present invention.

Illustrated in FIG. 1 is a block diagram of a first embodiment of the feed rate control apparatus at arcuate portions according to the present invention.

In FIG. 1, the numerical control data from a recording media such as an NC tape 2 and the like Is received by data receiver/decoder 11 for decoding, After decoding by the data receiver/decoder 11, the shape data for a workpiece to be machined are generated. The shape data contain, for example, the radius Rc data for the path of arcuate tool movement in a curved surface machining, the machining speed (command feed rate) data in linear machining, etc. Various tools, such as a cutting tool, a grinding tool, a spring bite, etc., are represented by a cutting tool hereunder.

A tolerable feed rate calculator 12 receives the Rc data and the like from the data receiver/decoder 11 and calculates the tolerable feed rate F1 based on the calculation expression as described hereinafter by reading out calculation parameters stored in a memory 13. An actual feed rate setter 14 sets the actual feed rate Fa by comparing the tolerable feed rate F1 received from the tolerable feed rate calculator 12 and the command feed rate Fc received from the data receiver/decoder 11. The detailed method of setting the Fa is described hereinafter. The actual feed rate setter 14 sends out a speed control signal to a servo section (not shown).

Figure 2:
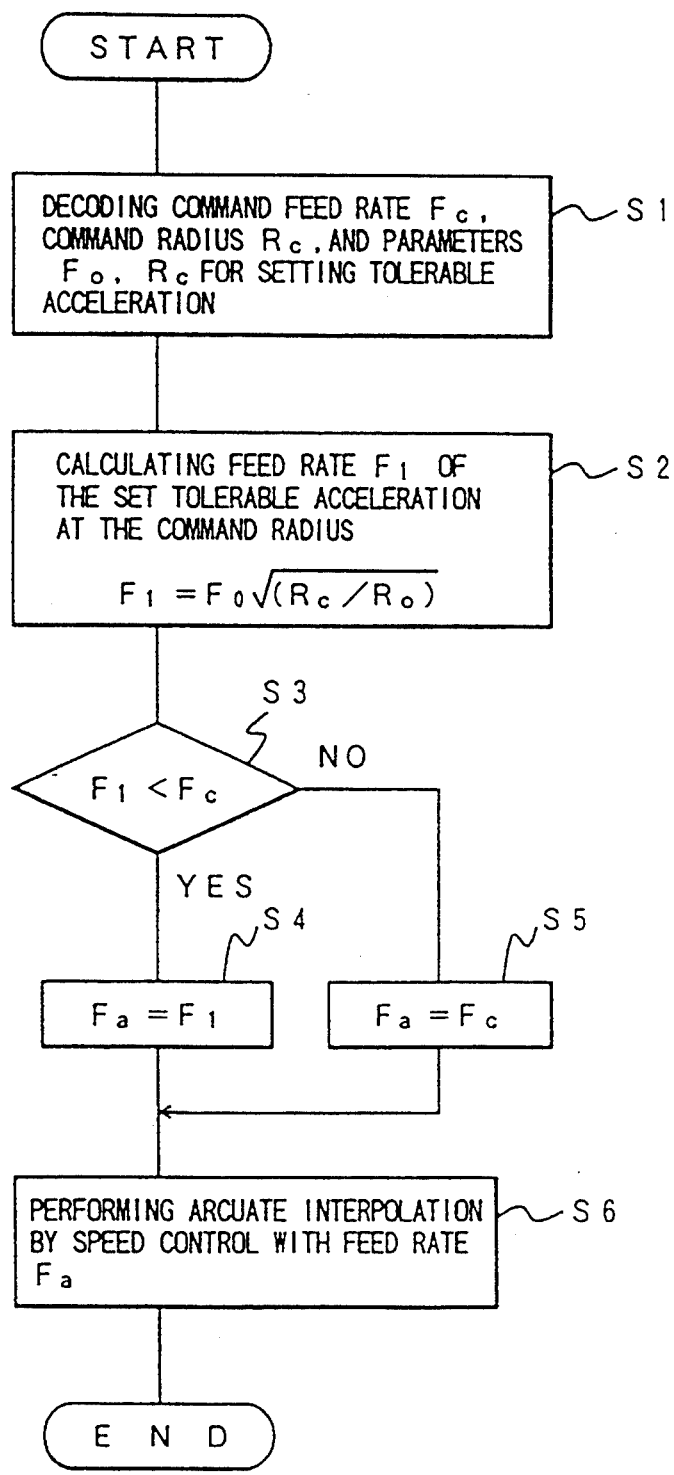
FIG. 2 is a flowchart showing the operation procedure of a first embodiment of the feed rate control method at arcuate portions according to the present invention.

FIG. 2 is a flowchart showing the steps of the feed rate control method at arcuate portions according to the present invention.

Figure 3:
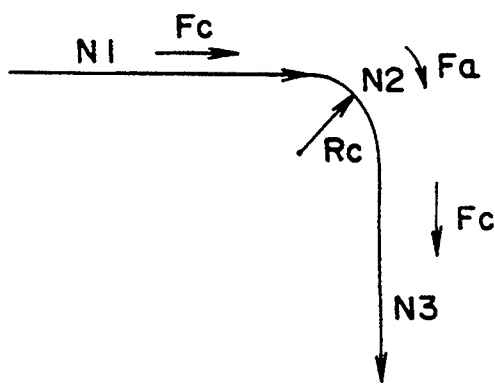
FIG. 3 illustrates the relationship between the cutting tool path and the feed rate in an arcuate machining to which the present invention is applied.
Figure 4:
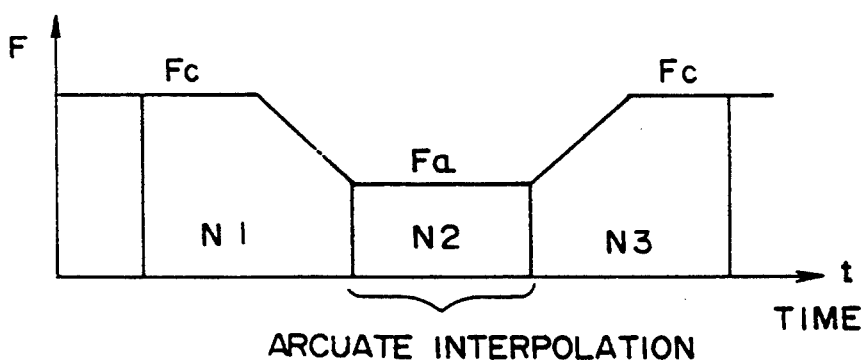
FIG. 4 is a graph illustrating the change in feed rate in machining the example as shown in FIG. 3.

The path of movement of the center of the tool in the machining operation is shown in FIG. 3, In the machining step (block) N1, the cutting tool is carrying out a linear machining at the feed rate Fc. The feed rate Fc is set to the optimum high speed for the linear machining. After machining in the block N1, an arcuate machining is carried out in the block N2. The feed rate for the arcuate machining is set to the optimum value Fa in accordance with the radius of curvature Rc as described hereinafter. Subsequent to the arcuate machining in the block N2, linear machining is again carried out in the block N3. The feed rate for the linear machining in the block N3 returns to the Fc again. FIG. 4 shows a graph of the change in feed rate during the transition of the linear machining, the arcuate machining and then the linear machining.

The optimum feed rate Fa in the block N2 is set in the following manner.

The arcuate movement of the cutting tool in arcuate machining is divided into X and Y axis movements, wherein the divisional speed takes sine and cosine paths. Acceleration of the movement in each axis becomes maximum when the speed is 0. The acceleration is counter proportional to the radius of curvature and proportional to the second power of the speed.

It is to be noted that the mechanical shock of the cutting tool in arcuate machining depends on the acceleration of the cutting tool. If the acceleration is set below the tolerable level, there is no mechanical shock and making high accuracy machining possible. An acceleration measurement can be made by simply using an acceleration sensor.

In the present invention, previously calculated is a tolerable speed Fo to provide a tolerable acceleration in machining with the radius of curvature Ro. The relationship with the tolerable feed rate F1 when commanded a radius of an arcuate Rc in an actual machining is given by the following equation:

$$F1^2/Rc = Fo^2/Ro \quad (1)$$

Also, the tolerable feed rate F1 for the radius of curvature Rc in an actual arcuate machining is given by the following equation:

$$F1 = Fo \sqrt{(Rc/Ro)} \quad (2)$$

Accordingly, in machining steps, tolerable speeds F1 defined by the equation (2) for each radius of movement of the cutting tool at each arcuate portion. If the linear feed rate (command feed rate) Fc for the block N1 is larger than the calculated feed rate, the tool is automatically decelerated to the tolerable feed rate F1 to control the maximum acceleration by restriction the maximum acceleration for each axis to less than the tolerable acceleration.

Figure 5:
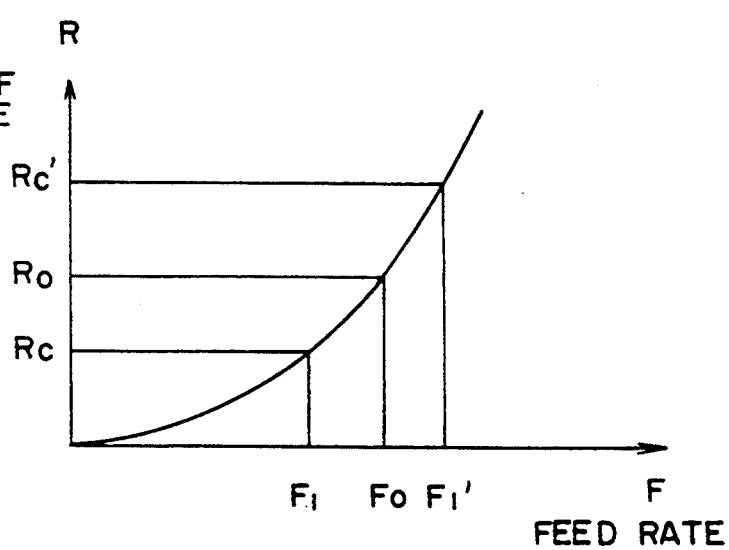
FIG. 5 is a graph showing the relationship between the tolerable feed rate and the radius of curvature in an arcuate machining according to the present invention.

Shown in FIG. 5 is the relationship between the feed rate F and the radius of curvature R during arcuate machining, in accordance with the above equation (1). The curvature in FIG. 5 can primarily be determined by experimentally obtaining the tolerable speed Fo corresponding to the tolerable acceleration for the predetermined radius of curvature Ro. Accordingly, tolerable feed rates F1, F1', etc. for radii of curvatures Rc, Rc', etc. of arcuate machinings are calculated based on the obtained curve for performing tile arcuate machining.

An example of the feed rate control method at arcuate portions in accordance with the present invention will be described hereunder by reference to FIG. 2. Firstly, entered are such parameters as the command feed rate Fc to be determined by the material and shape of the workpiece and the cutting tool, the radius of path of the cutting tool (command radius of the arc) Rc for the arcuate machining, and the tolerable acceleration setting parameters Fo, Ro (Step S1). Then, the tolerable feed rate F1 is calculated from the above equation (2) using the above parameters (Step S2). Subsequently, a judgment is made to determine if F1 is lower than the command feed rate Fc (Step S3). If it is lower, the actual feed rate Fa is set to F1, i.e., Fa= F1 (Step S4). On the other hand, if F1 is higher than or equal to Fc, Fa is set to Fc, i.e., Fa=Fc (Step S5). After setting the actual feed rate Fa in Step S4 and Step S5, an arcuate machining (interpolation) is carried out by speed controlling at the feed rate Fa (Step S6).

In the above embodiment, the position data at the start point of the previously entered in the NC tape 2 is received by way of the data receiving/decoding portion 11. A deceleration start point is calculated from the received position data and the tolerable acceleration data previously stored in the memory 13. At the point, the deceleration is started to reduce the speed to the tolerable feed rate at the start point of the arcuate block. The feed rate is controlled to maintain the tolerable feed rate during the machining of the arcuate block. Then, a feed rate control method and apparatus for high speed arcuate machining will be studied. Firstly, two conventional feed rate control methods at arcuate machining portions will be described by reference to FIGS. 9 and 10.

Figure 9:
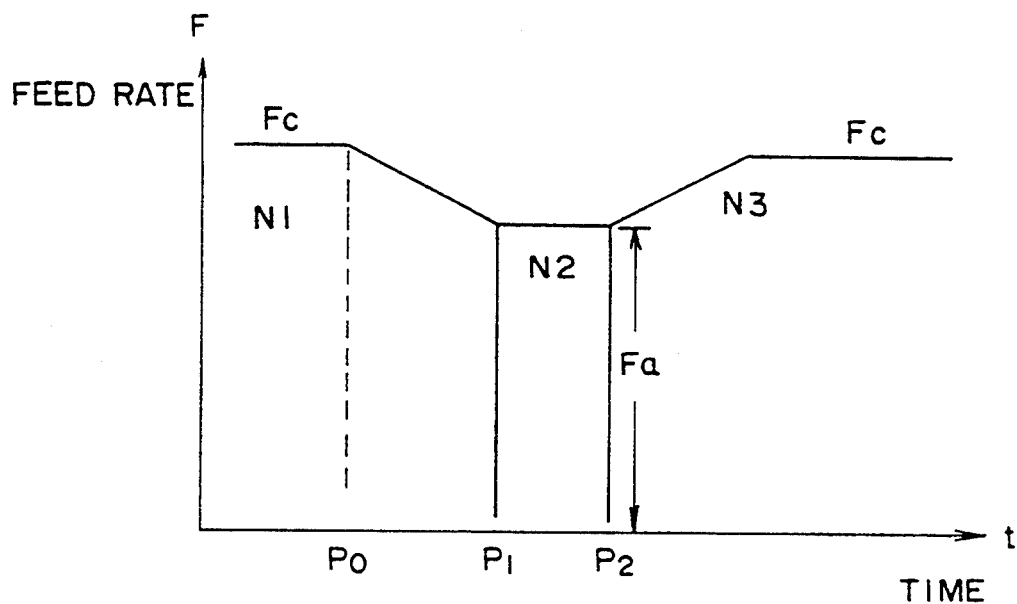
FIG. 9 is a graph illustrating the change in feed rate for describing one conventional example of a method of controlling the feed rate in an arcuate machining.

Shown in FIG. 9 is a graph of change in the feed rate for linear machining block N1, arcuate machining block N2 and linear machining block N3, in accordance with the former conventional deceleration method. The feed rate Fc is high in the linear machining but is set to a deceleration tolerable feed rate Fa for tolerable mechanical shock. In the conventional method, deceleration is initiated at a constant rate on the half way point Po of the linear machining block N1 so that the reduced feed rate Fa is established at the start point P1 for the arcuate machining block N2.

Figure 10:
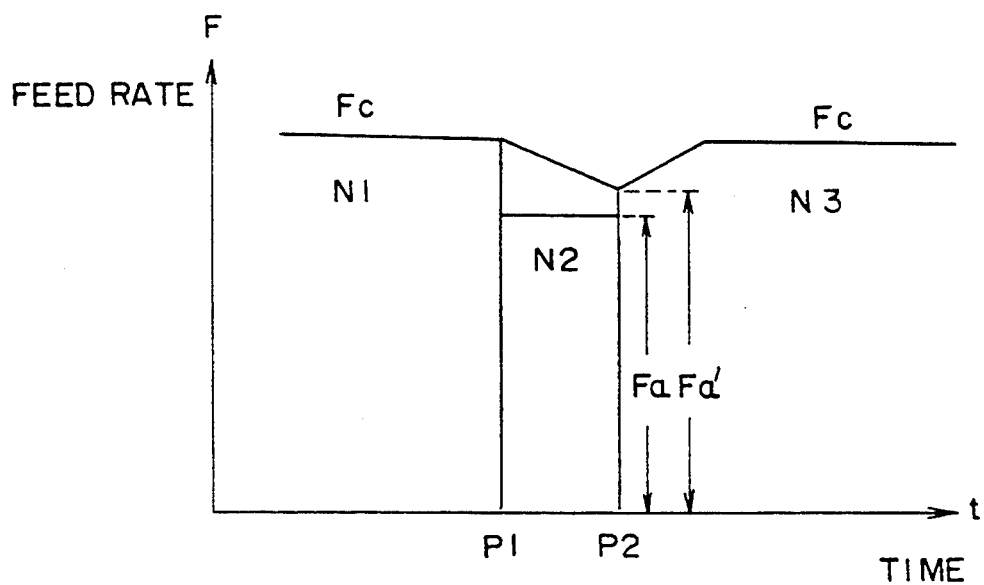
FIG. 10 is a graph illustrating the change in feed rate for describing another conventional example of a method of controlling the feed rate in an arcuate machining.

On the other hand, shown in FIG. 10 is a graph of change in the feed rate in accordance with the latter conventional deceleration method. In this method, deceleration at a constant rate starts at the start point P1 for the arcuate machining block. There may be no problem in reaching the expected reduced rate Fa at the end of the arcuate machining block if the arcuate block is longer than the distance required for deceleration. However, if it is shorter, the feed rate does not reach to the required reduced feed rate Fa at the end of the arcuate machining block, but reaches only a higher feed rate Fa'. As a result, mechanical shock exceeding the tolerable level occurs to degrade machining accuracy.

The inventors recognized the fact that mechanical shock would occur at the end of the arcuate machining block and that the aforementioned tolerable feed rate should be reached by the end of the arcuate machining block. Accordingly, the NC data is read to determine the end of the arcuate block to calculate where deceleration must be initiated under the predetermined deceleration rate to meet the requirement. The feed rate is, then, controlled to initiate the deceleration at the calculated point. One embodiment of this invention will be described by reference to FIGS. 6 through 8.

Figure 6:
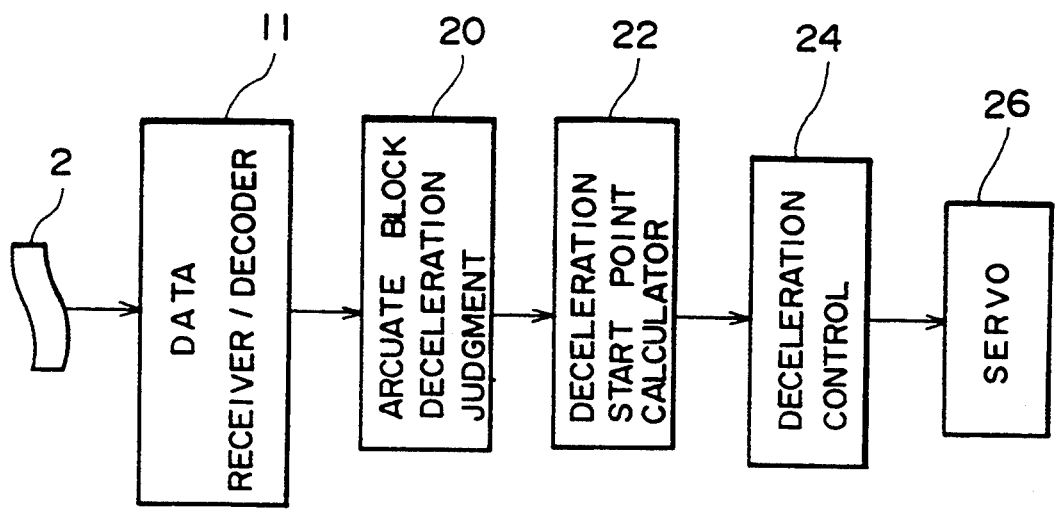
FIG. 6 is a block diagram for a second embodiment of the feed rate control system at arcuate portions according to the present invention.
Figure 7:
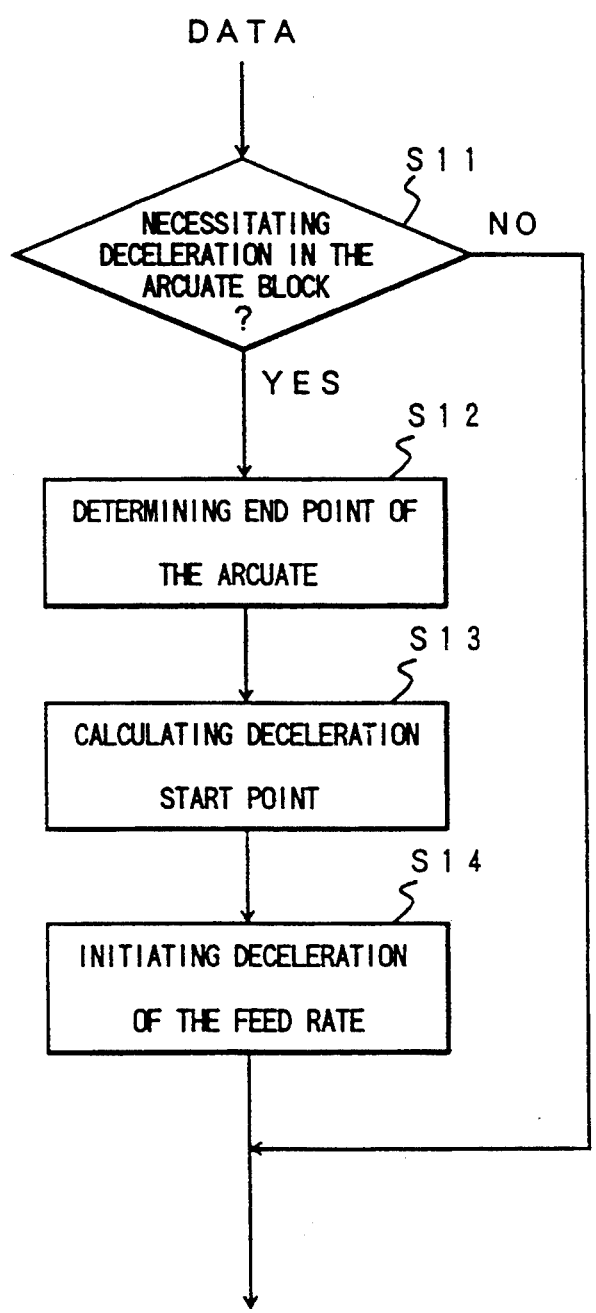
FIG. 7 is a flowchart to show operation procedures in the second embodiment of the method and apparatus for feed rate controlling at arcuate portions according to the present invention.

Illustrated in FIG. 6 is a block diagram of the feed rate control apparatus according to the present invention. FIG. 7 is a flowchart to show tile steps in the feed rate control method according to the present invention.

In the embodiment, description is made for the steps from and to linear machining blocks N1 and N3 by way of an arcuate machining block N2 as shown in FIG. 3.

Referring to FIGS. 6 and 7, the read-out machining shape data (data of the path of movement of the cutting tool) and feed rate data are received by a data receiver/decoder 11 and decoded. An arcuate block deceleration judgment section 20 makes a judgment based on the shape data from the data receiver/decoder 11 whether or not deceleration is needed in the arcuate machining block (Step S11). If it is judged that there is no need to decelerate, the command feed rate Fc is fed to a servo section 26, to maintain the command feed rate. If is judged to decelerate in the arcuate processing block, a calculation is performed to determine the end point of the arcuate (Step S12). The calculated end point is sent to a deceleration start point calculator 22 along with the reduced feed rate for the arcuate machining.

Figure 8:
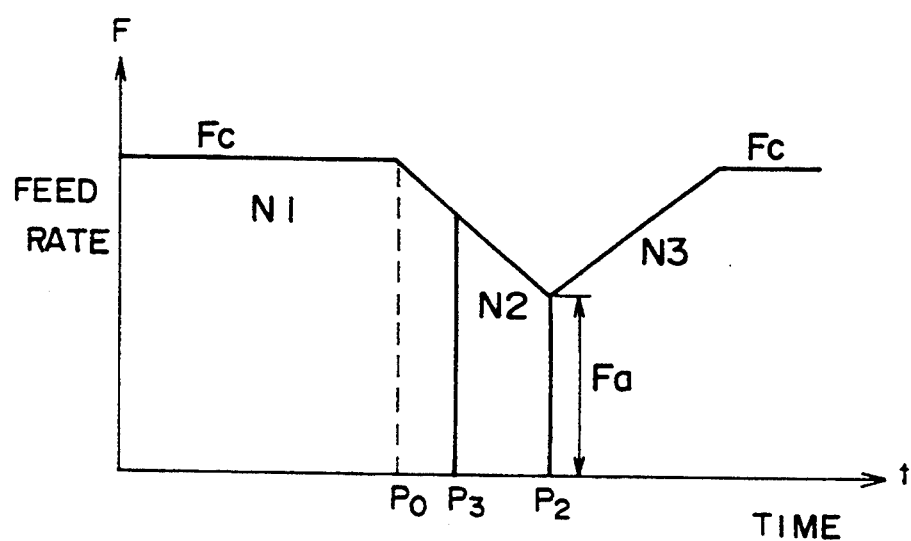
FIG. 8 is a graph illustrating tile change in feed rate in the second embodiment.

As illustrated in FIG. 8, the deceleration start point calculator 22 calculates the deceleration start point Po based on the command feed rate and a constant acceleration so that the feed rate changes from Fc to Fa at the end point P2 of the arc (Step S13).

A deceleration control section 24 receives the deceleration start point Po information to instruct the servo section 26 to initiate deceleration of the feed rate (Step S14).

The above method ensures a higher speed machining than the embodiment as shown in FIG. 2 while maintaining substantially similar machining accuracy.

Figure 11:
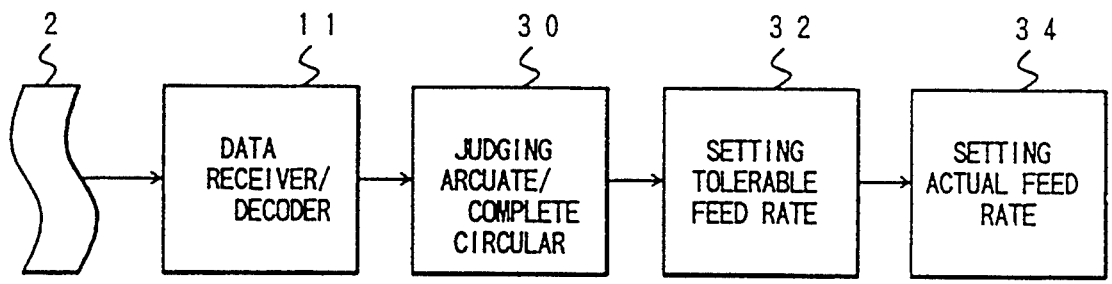
FIG. 11 is a block diagram of a third embodiment of the feed rate control apparatus at arcuate portions, according to the present invention.
Figure 12:
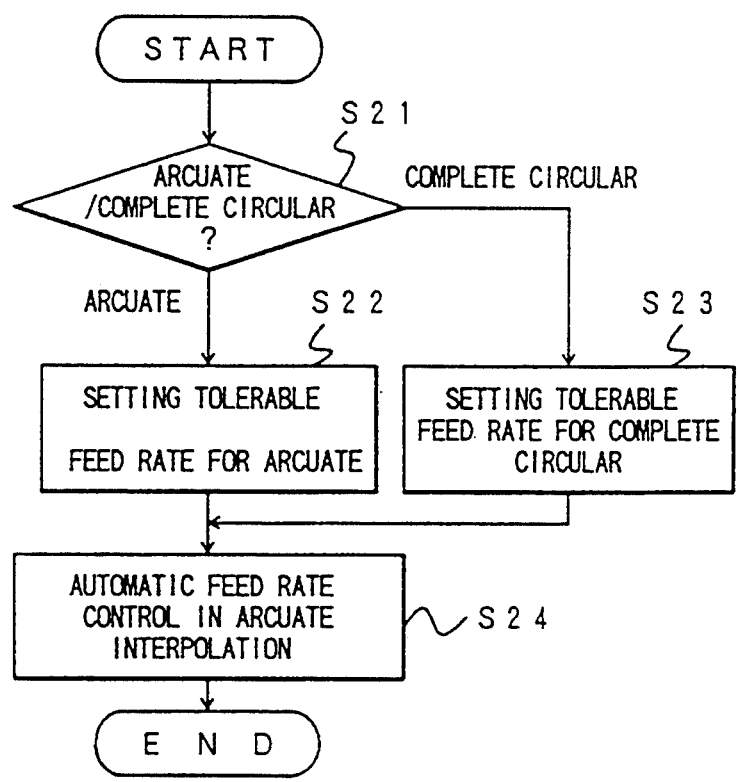
FIG. 12 is a flowchart showing operation procedures in the third embodiment of the method and apparatus of feed rate control at arcuate portions, according to the present invention.

Still another embodiment of tile present invention will be described by reference to FIGS. 11 through 15. Illustrated in FIG. 11 is a block diagram of the feed rate control apparatus according to the still another embodiment of the present invention. FIG. 12 Is a flow chart to show operation steps of tile feed rate control method of the present invention.

In the present invention, a judgment is made if the workpiece to be machined is either arcuate (partially circular) or completely circular to determine appropriate tolerable feed rate based on tile judgment.

In other words, in a partially circular machining, a sudden change in acceleration occurs at the transition from an arcuate machining to a linear machining due to mechanical shock, thereby causing fluctuation of tile cutting tool to degrade machining accuracy. It is, therefore, necessary to decelerate for the maintenance of accuracy. On the contrary, in case of a completely circular machining, fluctuation due to mechanical shock may occur after the required completely circular machining. Accordingly, there is essentially no accuracy problem in a completely circular machining and thus no deceleration is required unlike in an arcuate machining. In the present invention, high speed machining for possible maximum efficiency is achieved by decelerating in arcuate machining but minimizing such deceleration in completely circular machining.

The relationship between the path of the cutting tool and the feed rate in arcuate machining is as shown in FIG. 3.

Figure 13:
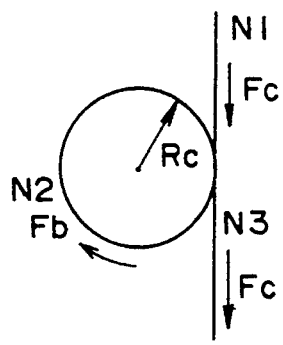
FIG. 13 illustrates the tool path and feed rate for machining block unit in a completely circular machining in the third embodiment.

In FIG. 13, a command feed rate Fc is set in block N1, while setting the feed rate Fb for a completely circular machining of radius Rc in block N2. The feed rate Fb is set at a higher tolerable feed rate than that in an arcuate machining. Subsequently, the feed rate is set again to the command feed rate Fc in block N3 for a linear machining.

Figure 14:
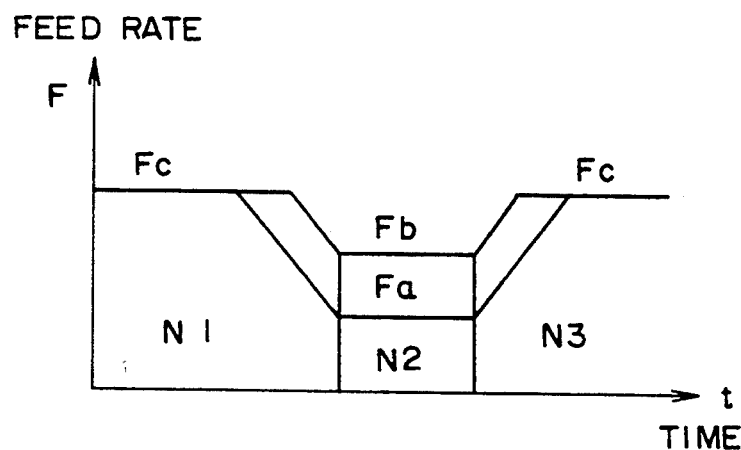
FIG. 14 is a graph to show the change in feed rate for each machining block unit in a series of arcuate and completely circular machining steps in the third embodiment.

Illustrated in FIG. 14 are the differences in the time required for machining and the feed rate in FIGS. 3 and 13. As illustrated in FIG. 11, it comprises a data receiver/decoder 11 to receive and decode workpiece data, command feed rate data, etc. from media 2 such as an NC tape and the like, a judgment section 30 to judge based on the decoded shape data if the workpiece is either arcuate or completely circular, a tolerable feed rate setting section 32 to calculate an optimum tolerable feed rate for tile arcuate and completely circular machinings based on the judgment by the judgment section 30 and an actual feed rate setting section 34 to set the actual feed rate based on the calculated tolerable feed rate.

Now, the operation of this embodiment of the present invention will be described by reference to FIG. 12. A judgment is made based on the shape data in the NC program data supplied from the NC tape 2 if the machining of the workpiece is either completely circular or arcuate (Step S21). If judgment is made to be arcuate, an optimum tolerable feed rate F1 for an arcuate machining with radius of curvature R1 is set taking machining accuracy and speed into consideration (Step S22). On the other hand, if judged to be a completely circular machining in Step S21, an optimum tolerable feed rate F2 for radius R2 is set in the similar manner (Step S23). However, a higher feed rate can be set in this case because less attention to machining accuracy than the case of an arcuate machining is needed as mentioned above. In this manner, the actual feed rate is set by an automatic speed control function in an arcuate interpolation based on the tolerable feed rates F1 and F2 (Step S24).

Figure 15:
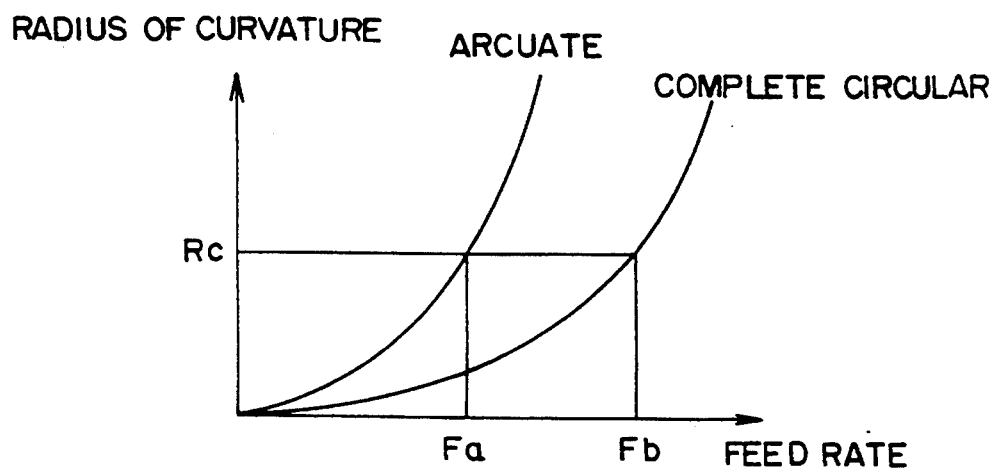
FIG. 15 illustrates the relationship between the radius of curvature and the feed rate in the arcuate and completely circular machining steps in the third embodiment.

The tolerable feed rate setting for arcuate and completely circular machinings in the above Steps S22 and S23 may be made, for example, in accordance with the curve as illustrated in FIG. 15. The relationship between the radius of curvature R and the actual feed rate F calculated from the tolerable feed rate is shown in FIG. 15. As mentioned above, for a given radius R, the tolerable feed rate for a completely circular machining is chosen higher than for an arcuate machining.

The feed rate for an arcuate machining is set to a tolerable acceleration to minimize degradation in machining accuracy depending on its radius. In other words, let the tolerable feed rate for radius Ro be the maximum feed rate to maintain the tolerable acceleration, the tolerable feed rate F1 for radius Rc is given by the following equation:

$$F1 = Fo \sqrt{(Rc/Ro)}$$

The actual feed rate is set based on this tolerable feed rate. In FIG. 15, the feed rate Fa is set for an arcuate machining of radius Rc.

On tile other hand, the food rate for a completely circular machining of radius Rc is set to Fb which maintains acceleration and, in turn, mechanical shock within a tolerable level, thereby achieving a high speed machining. The curve for the completely circular machining in FIG. 15 can be obtained through an experiment of each machining tool having a characteristic tolerable acceleration.

As understood from the above description, the feed rate control method at arcuate portions according to the present invention features in calculating the tolerable feed rate predetermined by the tolerable acceleration for the radius of curvature in the radius of movement of the cutting tool, and controlling the actual feed rate not to exceed the calculated tolerable feed rate. Accordingly, optimum feed rates can be set automatically for the machining of various curvatures. In this manner, there is no need to specify in the NC program various feed rates at the corners, thereby avoiding personal experiences and intuition of the programmer to realize high machining accuracy and high speed machining while avoiding complicated feed rate setting.

Also, a deceleration start point is set based on the end point of an arcuate machining and the predetermined deceleration so that the predetermined reduced speed is established at the end of such arcuate machining and that mechanical shock is maintained less than the tolerable level. This ensures that the reduced speed is reached at the end of arcuate machining even if the length of the arcuate portion is shorter than the distance required for deceleration. As a result, high speed numerical control can be performed in the case where the path of movement of the cutting tool includes arcuate portions or in machining curvatures.

Additionally, a judgment is made automatically if the path of movement of the cutting tool is arcuate or completely circular to set optimum feed rates for the arcuate and completely circular machinings based on the judgment. This assures that a completely circular machining can be performed at higher feed rate than an arcuate machining, thereby achieving more efficient, highly speed and highly accurate machining for curvatures.

What is claimed is:

1. A feed control method for a numerical control system, including the steps of:
    calculating a tolerable feed rate for a tool which is machining an arcuate portion of a workpiece, the tolerable feed rate being based on the radius of movement of said tool and a predetermined tolerable acceleration or deceleration of said tool; and
    setting the actual feed rate for the arcuate portion based on the calculated tolerable feed rate.

2. A feed rate control method in accordance with claim 1, wherein deceleration of the tool is initiated at a deceleration start point determined be reference to a start point of the arcuate portion and said predetermined tolerable acceleration so that the calculated tolerable feed rate is reached at the start point of the arcuate portion.

3. A feed rate control method for machining arcuate portions of a workpiece in accordance with claim 2, wherein the tolerable feed rate F1 for radius Rc is determined by the following equation:

$$F1 = Fo \sqrt{(Rc/Ro)}$$

where, Fo is the tolerable feed rate corresponding to the tolerable acceleration for the predetermined radius Ro.

4. A feed rate control method in accordance with claim 1, wherein deceleration of the tool is initiated at a deceleration start point determined by the end point of the arcuate portion and the predetermined tolerable acceleration, so that the calculated tolerable feed rate is reached at the end point of the arcuate portion.

5. A feed rate control method for machining arcuate portions of the workpiece in accordance with claim 4, wherein the tolerable feed rate F1 for radius Rc is determined by the following equation:

$$F1 = Fo \sqrt{(Rc/Ro)}$$

where, Fo is the tolerable feed rate corresponding to the tolerable acceleration for a predetermined radius Ro.

6. A feed rate control method in accordance with claim 1, whereby a tolerable feed rate F1 for a tool having a radius of movement Rc is determined by the equation:

$$F1 = Fo \sqrt{(Rc/Ro)}$$

where Fo is the tolerable feed rate corresponding to the predetermined tolerable acceleration for predetermined radius Ro.

7. A feed rate control method for a numerical control system, including the steps of:
    calculating a tolerable feed rate for a tool which is machining an arcuate portion of a workpiece, the tolerable feed rate being based on the radius of movement of the tool and a predetermined tolerable acceleration or deceleration;
    determining if the actual feed rate of the tool is higher or lower than the calculated tolerable feed rate; and
    setting the actual feed rate to the calculated tolerable feed rate if the calculated tolerable feed rate is higher than the actual feed rate.

8. A feed rate control method for machining arcuate portions of a workpiece in accordance with claim 7, wherein deceleration is initiated at a deceleration start point to be determined by reference to a start point of the arcuate portion and the predetermined tolerable acceleration, so that the tolerable feed rate is reached at the start point of the arcuate portion.

9. A feed rate control method for machining arcuate portions of a workpiece in accordance with claim 7, wherein deceleration is initiated at a deceleration start point to be determined by reference to an end point of the arcuate portion and the predetermined tolerable deceleration, so that the tolerable feed rate is reached at the end point of the arcuate portion.

10. A feed rate control method for machining arcuate portions of the workpiece in accordance with claim 7, wherein the tolerable feed rate F1 for radius Rc is determined by the following equation:

$$F1 = Fo \sqrt{(Rc/Ro)}$$

where, Fo is the tolerable feed rate corresponding to the tolerable acceleration for a predetermined radius Ro.

11. A feed rate control method for a numerical control system, comprising the steps of:
    determining if the path of movement of a tool operated by the numerical control system is arcuate or entirely circular;
    calculating optimum tolerable feed rates for the arcuate and entirely circular portions, based on the radius of movement of the tool and a predetermined tolerable acceleration or deceleration of the tool; and
    controlling the actual feed rates based on the calculated optimum tolerable feed rates.

12. A feed rate control apparatus for a numerically controlled machining tool, comprising:
    tolerable feed rate calculation means for calculating the tolerable feed rate for the tool to machine an arcuate portion of a workpiece, the calculations being based on radius data of the path of movement of the tool and predetermined tolerable acceleration or deceleration data for the tool; and
    feed rate setting means for setting the actual feed rate based on the tolerable feed rate obtained from said tolerable feed rate calculation means.

13. A feed rate control apparatus as claimed in claim 12, further including:
   deceleration start point calculation means for calculating a deceleration start point for initiating deceleration based on received start point data for an arcuate portion of a workpiece to be machined and on said predetermined tolerable deceleration data, so that a tolerable feed rate is reached at the start point of the arcuate portion; and
   deceleration control means for initiating deceleration control at the deceleration start point determined by the deceleration start point calculation means.

14. A feed rate control apparatus for machining arcuate portions of the workpiece in accordance with claim 13, wherein said tolerable feed rate calculation means determines a tolerable feed rate F1 for radius Rc based on the following equation:

$$F1 = Fo \sqrt{(Rc/Ro)}$$

where, Fo is the tolerable feed rate corresponding to a tolerable acceleration for a predetermined radius Ro.

15. A feed rate control apparatus in accordance with claim 12, further comprising:
   deceleration start point calculation means for calculating the deceleration start point for initiating deceleration control based on received end point data for an arcuate portion of a workpiece and said predetermined tolerable deceleration data; and
   deceleration control means for initiating deceleration control at the deceleration start point obtained from the deceleration start point calculation means.

16. A feed rate control apparatus for machining arcuate portions of a workpiece in accordance with claim 15, wherein said tolerable feed rate calculation means determines a tolerable feed rate F1 for radius Rc based on the following equation:

$$F1 = Fo \sqrt{(Rc/Ro)}$$

where, Fo is the tolerable feed rate corresponding to the tolerable acceleration for a predetermined radius Ro.

17. A feed rate control apparatus in accordance with claim 12, wherein said tolerable feed rate calculation means determines the tolerable feed rate F1 for a tool having a radius of movement Rc based on the equation:

$$F1 = Fo \sqrt{(Rc/Ro)}$$

where Fo is the tolerable feed rate corresponding to said predetermined tolerable acceleration data for said predetermined radius Ro.

18. A feed rate control apparatus for performing a numerically controlled machining of an arcuate portion of a workpiece by a tool, comprising:
   tolerable feed rate calculation means for calculating the tolerable feed rate for machining the arcuate portion, based on radius data of the path of movement of the tool and predetermined tolerable acceleration data;
   comparison means for comparing an actual feed rate with the tolerable feed rate obtained from the tolerable feed rate calculation means; and
   feed rate setting means for setting the actual feed rate to the tolerable feed rate when the actual feed rate is different than the tolerable feed rate.

19. A feed rate control apparatus for machining arcuate portions of a workpiece in accordance with claim 18, further comprising:
   deceleration start point calculation means to calculate a deceleration start point for initiating a deceleration control based on received start point data of the arcuate portion and predetermined tolerable acceleration data, so that the tolerable feed rate is reached at the start point of the arcuate portion; and
   deceleration control means to initiate deceleration control at the deceleration start point obtained from said deceleration start point calculation means.

20. A feed rate control apparatus for machining arcuate portions of a workpiece in accordance with claim 18, further comprising:
   deceleration start point calculation means to calculate the deceleration start point for initiating deceleration control based on end point data of the arcuate portion and the predetermined tolerable acceleration data; and
   deceleration control means to initiate deceleration control at the deceleration start point obtained from said deceleration start point calculation means.

21. A feed rate control apparatus for machining arcuate portions of a workpiece in accordance with claim 18, wherein said tolerable feed rate calculation means determines the tolerable feed rate F1 for a radius Rc based on the following equation:

$$F1 = Fo \sqrt{(Rc/Ro)}$$

where Fo is the tolerable feed rate corresponding to a tolerable acceleration for a predetermined radius Ro.

22. A feed rate control apparatus for a numerically operated tool for machining both arcuate and entirely circular portions of a workpiece, comprising:
   determining means for determining in accordance with data received on the movement of the tool whether the portion of the workpiece being machined is either arcuate or entirely circular;
   tolerable feed rate setting means for calculating the optimum feed rates for both the arcuate and entirely circular portions of the workpiece, based on the radius of movement of the tool and a predetermined tolerable acceleration; and
   feed rate setting means for controlling the actual feed rate based on the tolerable feed rate obtained from the tolerable feed rate setting means.

* * * * *